Jan. 25, 1966  C. R. THOMSON  3,230,796
OVERDRIVE TRANSMISSION
Filed Nov. 26, 1962  6 Sheets-Sheet 4
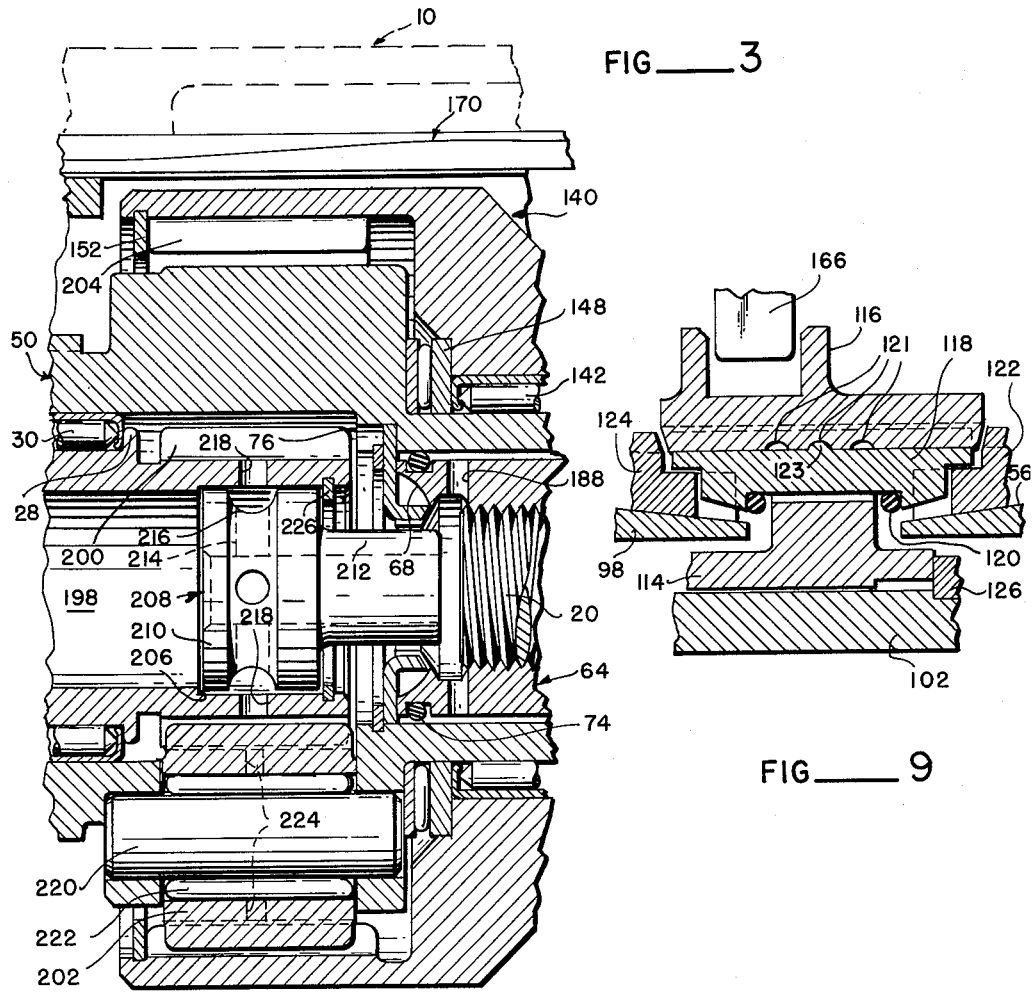
FIG___3
FIG___9
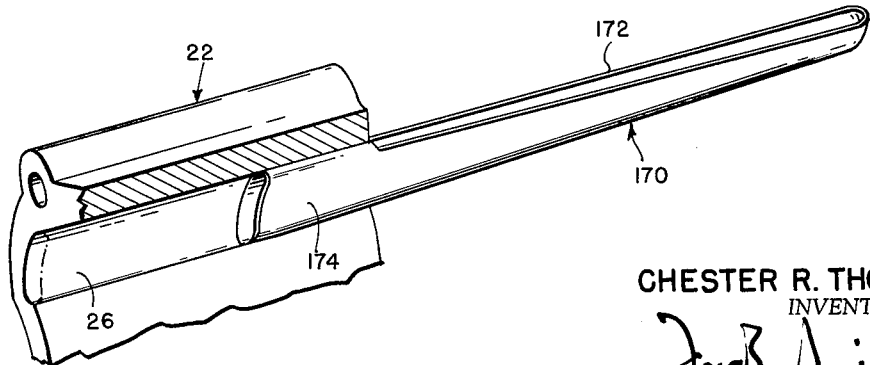
FIG___4
CHESTER R. THOMSON
INVENTOR.
BY
ATTORNEYS Jan. 25, 1966     C. R. THOMSON     3,230,796
OVERDRIVE TRANSMISSION
Filed Nov. 26, 1962     6 Sheets-Sheet 5
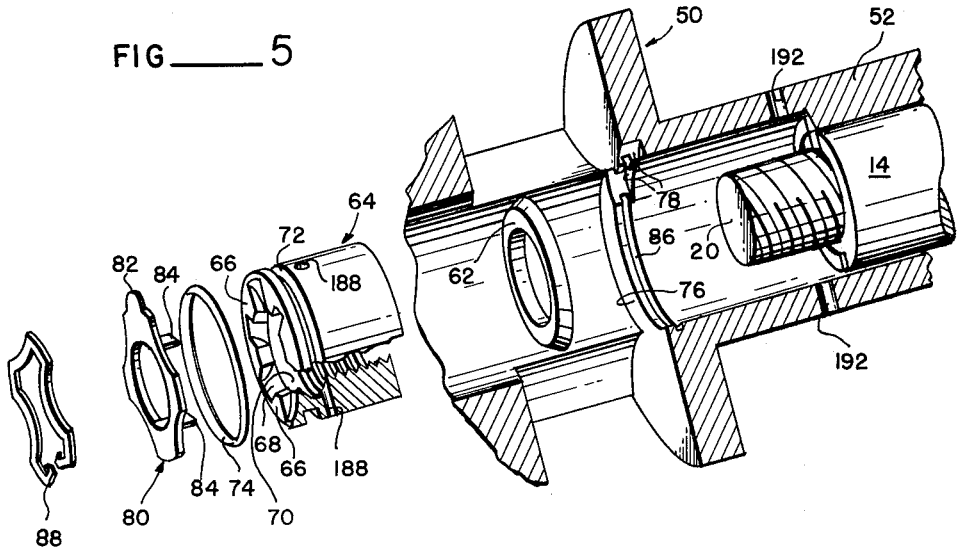
FIG. 5
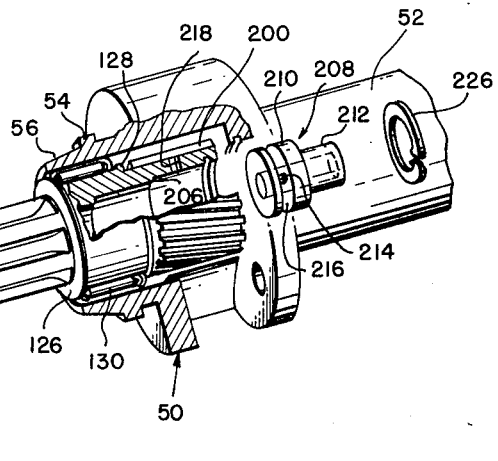
FIG. 6
CHESTER R. THOMSON
INVENTOR.
BY 
ATTORNEYS Jan. 25, 1966 C. R. THOMSON 3,230,796
OVERDRIVE TRANSMISSION
Filed Nov. 26, 1962 6 Sheets-Sheet 6
FIG. 7
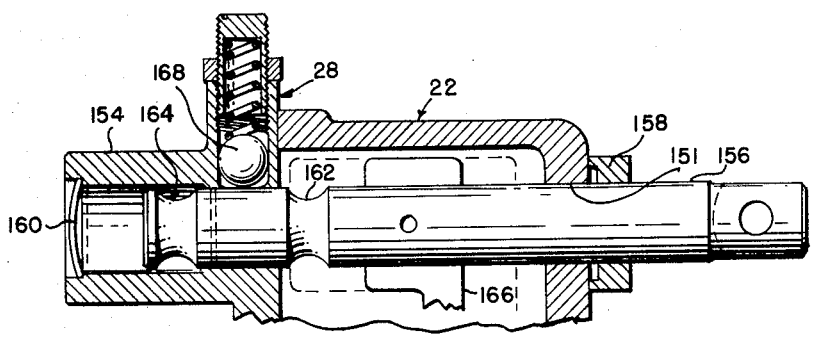
FIG. 8
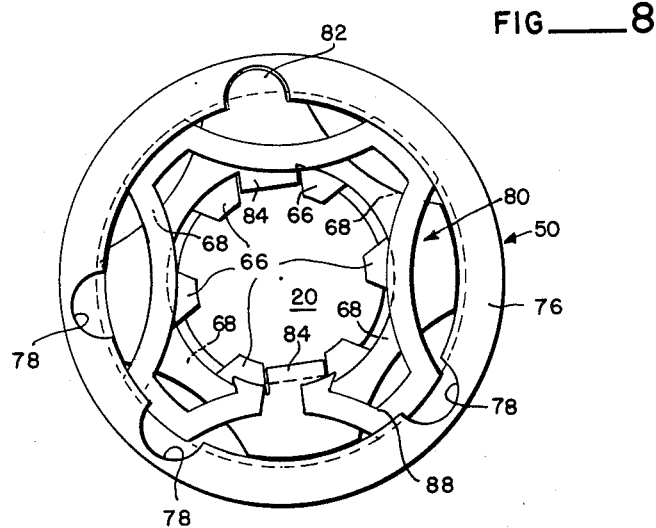
CHESTER R. THOMSON
INVENTOR.
BY 
ATTORNEYS

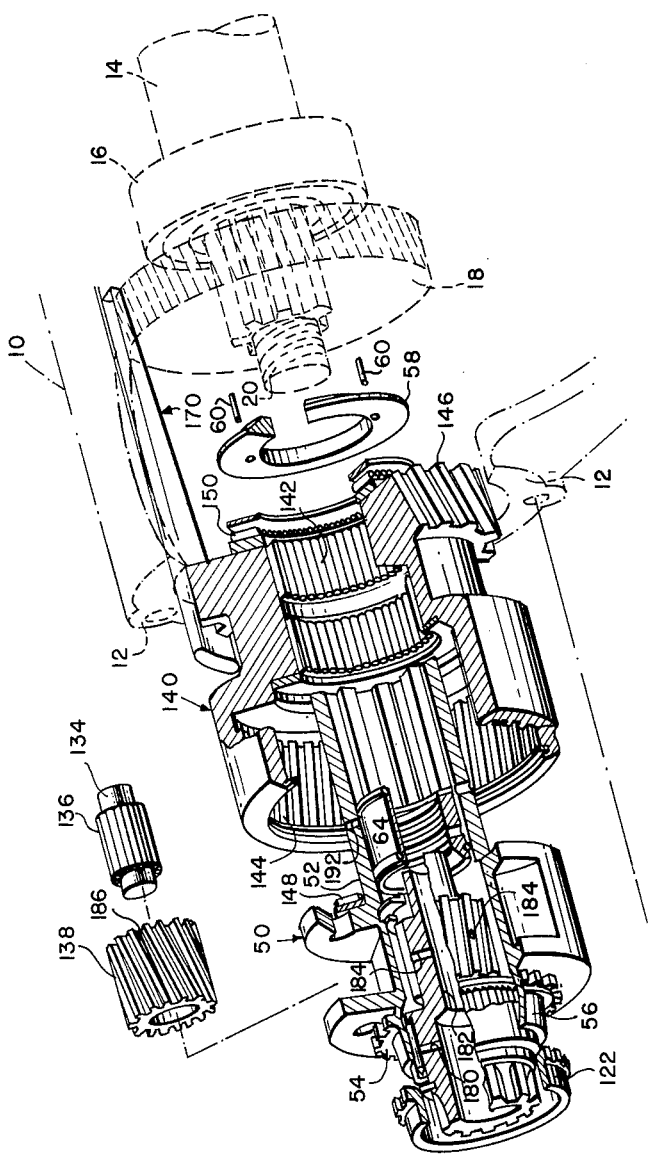

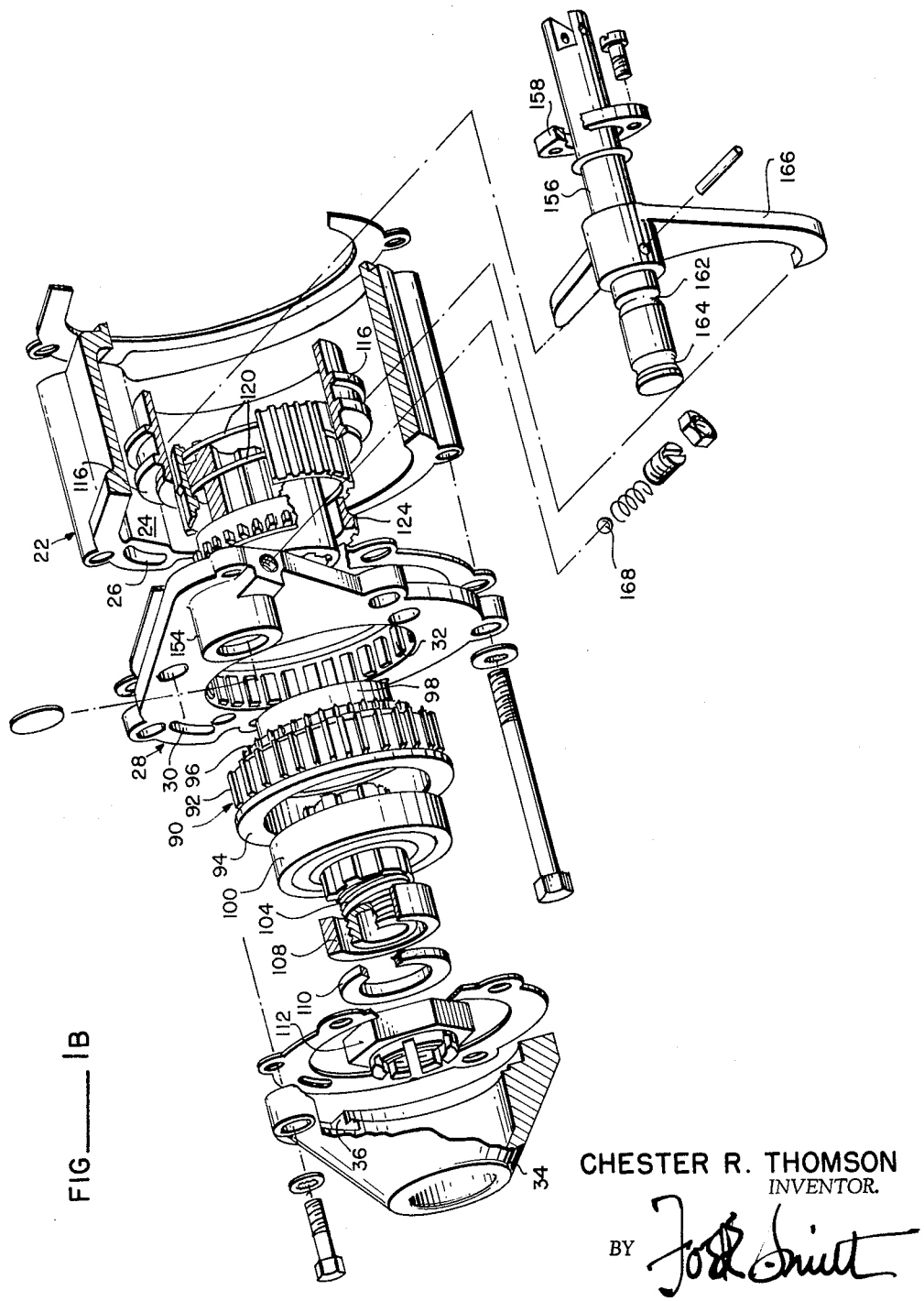

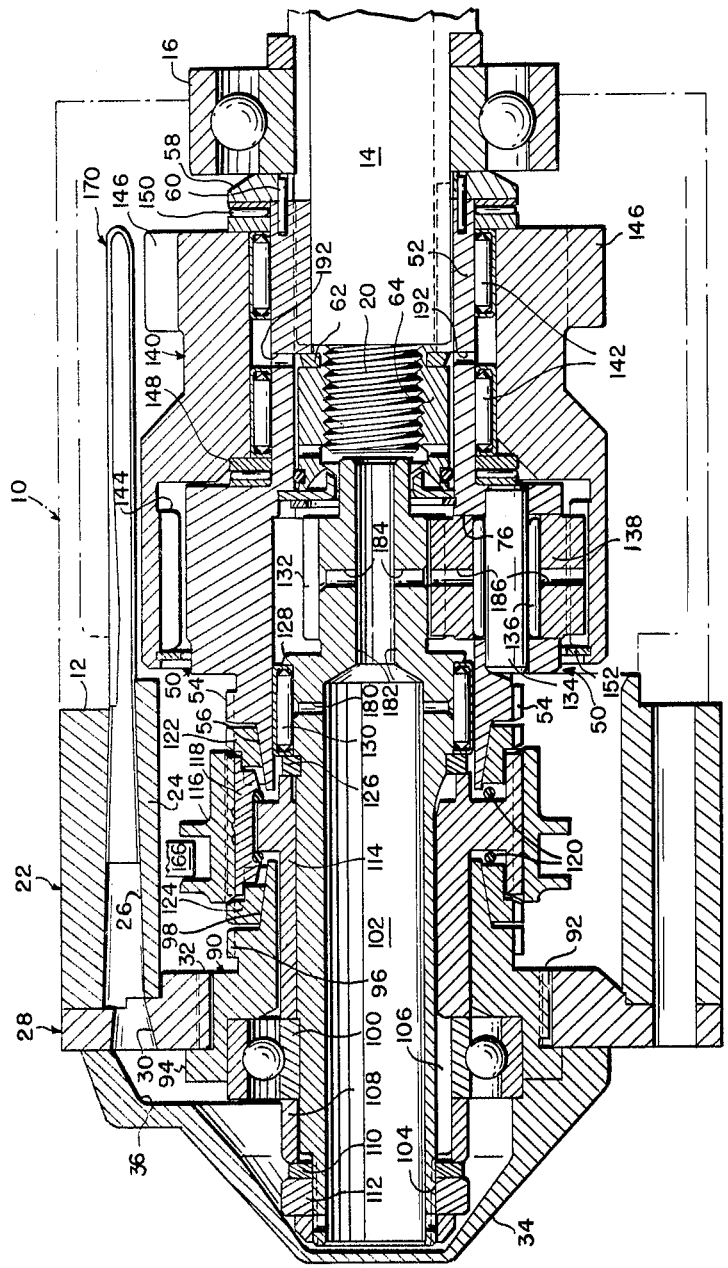

United States Patent Office

3,230,796
Patented Jan. 25, 1966

1

3,230,796
OVERDRIVE TRANSMISSION
Chester R. Thomson, Star Route Box 150,
Naches, Wash.
Filed Nov. 26, 1962, Ser. No. 239,889
6 Claims. (Cl. 74—781)

This invention relates to a new and useful concept in an overdrive transmission and a lubrication system therefor, and more particularly to a planetary type overdrive transmission which is readily attachable to the transfer case of a conventional automobile and which incorporates a combination gravity and centrifugal type oil circulating system for lubrication of all parts of the transmission.

Hitherto known types of planetary overdrives have been bulky, heavy and complicated besides being costly and inefficent. Proper lubrication without the need for involved pumping and circulating components has always been a problem. Manufacturers have long desired to have a compact, detachable overdrive package which could be connected to the transfer case of an automobile and purchased as optional equipment. Economics growing out of the nature of the existing overdrives have up to now prevented the manufacturers from offering such optional equipment.

This invention overcomes these difficulties by forming the sun gear directly on the driven shaft of the overdrive transmission at the center of the overdrive transmission and thus eliminating the sun gear sleeve common to other planetaries. Also this invention solves the lubrication difficulties in transmissions of this type by catching the lubricant in an oil scoop or tube above the longitudinal center line of the overdrive unit (inside the housing) and conveying said lubricant through special passages to the rear end of said transmission. The oil is then routed through a hollow driven shaft of the overdrive transmission and permitted by appropriate holes and passages to flow outwardly under centrifugal force to the various moving parts and bearings.

Accordingly it is an object of this invention to provide an overdrive transmission which is simple, compact and light and thus ideally suited to be added to the transfer case of an automobile for increasing wheel to motor speed ratios.

Another object of this invention is to provide an overdrive transmission which contains fewer moving parts than conventional planetary type overdrive transmissions.

Yet another object of this invention is to provide a transmission which is versatile enough so that overdrive ratios can be changed with a minimum of design changes.

Still another object of this invention is to supply an overdrive transmission which because of its simplicity of design is rugged in construction and economical to manufacture.

A further object of this invention is to provide an overdrive transmission which does not involve a positive internal or external pumping system for circulating lubricant but relies solely on gravity and centrifugal force.

An even further object of this invention is to furnish an overdrive transmission having a lubricating system which circulates large quantities of lubricant through passages constructed into the parts of the transmission.

A still further object of this invention is to provide an overdrive transmission which because of simple, light and compact characteristics can be offered as optional equipment on standard transmissions at reasonable cost.

Another object of this invention is to furnish an overdrive transmission incorporating significant improvements in the syncromesh clutching unit to increase the efficiency and effectiveness thereof.

Yet another object of this invention is to provide an

2 overdrive transmission which incorporates a new and novel locking mechanism for attaching a gear component to a high speed rotating shaft.

A further object of this invention is to supply an overdrive transmission which utilizes a new and novel lubricant receiving means within the transfer case which also permits said lubricant to be directed to the rear of the overdrive housing.

These, together with other objects and advantages which will become subsequently apparent, reside in the details of construction and operation as more fully hereinafter described and claimed, reference being had to the accompanying drawings, forming a part hereof, wherein like numerals refer to like parts throughout, and in which:

FIGURE 1A is an exploded or stretch-out view in perspective of the front half of the transmission;

FIGURE 2A as a continuation of FIGURE 1A is an exploded or stretch-out view in perspective of the rear half of the transmission;

FIGURE 2 is a side elevational view in cross section showing the transmission fully assembled;

FIGURE 3 is a partial side elevational view in cross section showing the sun gear and oil shaft arrangement for an alternative embodiment of this invention;

FIGURE 4 is a partial view in perspective of the oil tube or scoop as it is mounted in the transmission housing;

FIGURE 5 is a partial cut-away, stretch-out view in perspective of the elements by which this overdrive transmission is attached and locked onto the regular transmission drive shaft;

FIGURE 6 is a partial cutaway, stretch-out view in perspective of the overdrive and oil shafts in the alternative form of this overdrive transmission shown in FIGURE 3;

FIGURE 7 is a partial side elevational view in cross section showing the shifter rail or shaft and the manner in which it is mounted in the overdrive transmission housing;

FIGURE 8 is a partial elevational view of the drive nut for holding the overdrive transmission on the drive shaft, which view is taken along the line 8—8 of FIGURE 2; and FIGURE 9 is a partial cross section view of the synchromesh clutching unit showing a modified form of the mating ridge and groove feature.

*Housing*

Referring now to FIGURE 1A it will be seen that the transmission drive shaft 14 extends rearwardly from the regular transmission into the transfer case 10. Drive shaft 14 has roller bearings 16 near the end thereof. A drive gear 18 as a standard part of the transfer case 10 is splined to the end of drive shaft 14. It can be seen that drive shaft 14 also has the threaded end portion 20 of reduced diameter. It is drive gear 18 which is removed in order that the transfer case may accommodate the overdrive mechanism.

Transfer case 10 has rear face 12 and it is rear face 12 of the transfer case to which the front face of the overdrive housing is attached. The overdrive housing itself is comprised of three sections, the first of which is the housing case, generally shown by the number 22. Said housing case 22 is generally cylindrical casing approximately two and one-half inches deep by perhaps five and one-half inches in diameter. The upper right quadrant of housing case 22 when viewed from the rear is enlarged generally outwardly to provide an enclosed area away or spaced from the generally cylindrical interior of the housing case. The enlarged portion just described has as its function to accommodate the shifting mechanism used in conjunction with this overdrive.

In the upper left quadrant of housing case 22, as viewed from the rear (see also FIGURE 2), is an inwardly extending boss 24. Said boss 24 extends from the front face to the rear face of housing case 22. The boss 24 in effect is the inside wall of an oil passage extending between the front and rear faces of housing case 22. It should be noted that the passage, referenced by the number 26, is spaced only slightly above the center line of the housing case 22. The passage 26 tapers from a dimension at the front face of said housing case of about seven-eighths of an inch to a dimension of about one inch at the rear face of said casing. At the front of said housing case the bottom-most point of passage 26 is about ¼ inch above a horizontal plane taken through the center line of the housing case. By the same token, the bottom-most point of the passage 26 at the rear of said housing case is about ⅜ of an inch above said plane. Similarly the front width of passage 26 is about ⅛ inch less than the rear dimension. Passage 26 is about three times as high as it is wide and it will be seen that the passage, having particular reference to the lower portion thereof, slopes downwardly from the front to rear at about a 7° angle from the horizontal. The purpose for this slope will become obvious in discussion following. The dimensions here given are considered to be nonlimiting since obviously the passage could be placed further above the center line.

Attached to the rear face of housing case 22 is a housing cover generally shown by number 28. Cover 28 in its general outside configuration corresponds to that of housing case 22. A passage 30 is formed in said cover 28 to match or align with the passage 26 in the housing case 22. The general circular symmetry of cover 28 is broken by an enlarged portion having structure which is necessary in conjunction with the enlarged portion of housing 22 to provide supporting and housing means for the shifting mechanism which, as mentioned above, will be described later. An internal spline 32 is formed in cover 28 with said spline having a diameter of just slightly less than three inches. The purpose of said spline 32 will become obvious hereinafter. The rear end of the overdrive transmission housing is closed by a cap 34 which is generally frusto-conical in shape. Cap 34 has a notched portion 36 therein which, when the cap is attached to the housing case and housing cover, aligns itself with the passages 26 and 30 so that there is an unobstructed passage from the front face of the housing case to the innermost area of said cap 34.

*Transmission*

The components of the overdrive transmission will now be described beginning with the bearing 16 which lies between the main transmission and the transfer case and working rearwardly from said bearing until all parts have been described.

As mentioned hereinbefore the drive shaft 14 is splined and also carries on the end thereof a reduced diameter portion 20 which is threaded to receive a drive nut which will be described later. A planetary spider assembly 50 is internally splined through a sleeve portion 52. Spider 50 is so designed that approximately the forwardmost one-half of the length of sleeve portion 52 is internally splined to engage the splines of transmission shaft 14. Spider 50, of course, has as its purpose to carry the planet gears.

Sleeve portion 52 of spider 50 extends rearwardly over the threaded portion 20 of the transmission shaft and then enlarges to form the spider itself. As can be seen, the spider portion may be formed to hold either three or four planet gears. Extending rearwardly from the main spider portion is a splined boss 54 which as can be seen of less diameter than the main spider portion. Said splined boss 54 serves as one of the engaging members for the shifting mechanism. Rearwardly of spline boss 54 is conical surface 56 for receiving the rotating blocker ring of a synchro-mesh clutching unit. Immediately forward and abutting the splined sleeve section of spider 50 is a spacer washer 58 which surrounds transmission shaft 14 and which is connected for rotation with the shaft and the spider unit by virtue of positioning pins 60.

Connection of the spider unit 50 to the transmission shaft will now be described. Within the sleeve portion 52 of spider 50 and surrounding the threaded portion 20 is a thrust lock washer 62 which bears against a shoulder formed by the rear ends of the splines within said sleeve portion. Threaded on the nipple 20 is a drive nut 64 which bears against the thrust lock washer 62. Drive nut 64 is internally threaded through approximately the forward two-thirds of its length. The rear portion of drive nut 64 is comprised of a series of radially inwardly extending spaced apart teeth 66, preferably six in number. Between each of the teeth is a backwardly sloping surface 68. The inner edges of teeth 66 form a smaller diameter than is formed by the thread in the main body of the drive nut. Forward faces of the teeth 66 are cut radially and backwardly so that an annular recess 70 is formed back of teeth 66 and generally around the end of the threaded portion 20 of transmission shaft 14.

An annular groove 72 (see FIGURE 5) runs around the outer surface of drive nut 64 and is located generally at the rear portion of said drive nut. Groove 72 has as its function to accommodate the resilient O-ring 74. The rear end of the sleeve portion 52 of spider 50 forms a shoulder 76. Formed forwardly into said shoulder for a short distance are two semicircular recesses 78. A drive nut lock washer 80 (see FIGURES 5 and 8) is either a round washer-shaped element or preferably as shown a flat ring-shaped locking device in which either three or four equispaced arcuate notches are formed in the outside diameter. The number of arcuate notches will depend upon whether the transmission has three or four planetary gears. Between each pair of arcuate notches will be a short section of the outside diameter of the original or basic ring diameter. On the outside diameter of said lock washer 80, if it is round, and on the short outside diameter sections if it has the arcuate notches, is at least one semicircular radially outwardly extending nipple 82 which is dimensioned to fit into the semicircular recess or recesses 78. From the inside diameter of said drive nut lock washer are two prongs 84 which extend axially forwardly. It will be understood that when the drive nut 64 has been received on the threaded nipple 20 of the transmission, the drive nut lock washer is then slipped on so that the semicircular nipple 82 slips into recess 78. At the same time, the prongs 84 are engaged between teeth 66 of the drive nut itself. In this way, a positive interlock between the spider and the drive nut is achieved preventing the drive nut from unthreading itself from the transmission shaft. In order to insure, however, that the drive nut lock washer 80 is retained in place an annular groove 86 is formed to run around the inside surface of the sleeve 52 near the shoulder 76 and in fact so that it runs, as can be seen in FIGURE 5, through the semicircular recesses 78. In this manner, a spring acting retaining ring 88 is snapped into said annular groove 86 to firmly hold the drive nut lock washer 80 in position. Like the lock washer 80 the retaining ring can be round or assume the same irregular configuration to accommodate the planet gears. Thus, a secure connection is made between the spider unit 50 and the transmission shaft 14.

A stationary anchoring member, generally shown by the number 90, has teeth 92 for engaging the teeth 32 in the housing cover 28. The rearwardly facing portion of said stationary anchoring member 90 has a raised section 94 which forms a shoulder contacting the rear side of said housing cover 28. That portion of said stationary anchoring member which is forward of cover 28 includes an annular boss with spline teeth 96 which serve as the stationary element for the shifting mechanism. Forwardly of the stationary supplying teeth 96 is a cone surface 98 for the stationary blocker ring of the synchromesh shifting unit.

The rear portion of stationary anchoring member 90 is shaped to receive the rear main ball bearing 100 so that said bearing 100 is roughly centered with respect to the rear face of the housing cover 28. While the bearing 16 receives the transmission shaft 14, the rear main bearing 100 is the main support element for the shaft of the overdrive transmission which is descriptively referred to as the overdrive sun gears spline shaft 102.

This shaft 102 is coaxially aligned with transmission shaft 14. Overall length of the shaft 102 is about 6½ inches. The rearmost portion shown as spline of said spline shaft has a threaded nipple 104 of reduced diameter. A substantial portion of said shaft is splined over its outside diameter as at 106, commencing generally at the termination of the threaded portion 104 and extending forwardly along the outside diameter of the shaft so that in total nearly half of the entire length of said shaft 102 is splined. It will be seen that main rear bearing 100 fits over the spline section 106 and that abutting the rear side of said bearing 100 is a spacer washer 108 which can be removed, making available space for a power take-off gear (not shown). Spacer 108 can be seen also to encompass the very rearmost portion of the spline area 106. Immediately to the rear of and abutting spacer 108 is a washer 110 and finally threaded onto the threaded nipple 104 is the spline shaft lock nut 112. Nut 112 is slotted and the threaded portion 104 of the shaft 102 has a hole therethrough so that a cotter pin (see FIGURE 6) will in conventional manner hold said nut 112 on said threaded nipple 104.

Along the length of the shaft and engaged with the spline area 106 along that portion of the spline area 106 which is not taken up by bearings and spacers is a synchromesh drive member 114 in the form of a sleeve. Said drive member 114 is splined internally to engage spline 106 of the shaft 102. In typical fashion a raised portion of said drive member 114 is splined externally to receive the shift ring 116. It will be seen that the clutching unit has shifting dogs 118, shifting dog springs 120, rotating blocker ring 122 and stationary blocker ring 124.

Performance of the synchromesh clutching unit has been improved greatly by the incorporation of two significant changes. The cone surfaces 56 and 98 (referring now to FIGURE 9) have been extended from a point under the blocker rings 122 and 124 closer to the shifting dog springs 120. Such extension of the cone surfaces has been found to eliminate the problem of a shoulder wearing on the contact surface of the blocker rings formed by the end or edge of the cone surface in the shifting operation when the blocker rings are bumped by the shifting dogs. Formation of the shoulder eventually restrains the blocker rings from being moved tightly onto the cone surfaces thus interfering with the speed synchronizing function of said blocker rings. Another significant improvement was achieved by providing the inside surface of shift ring 116 with three grooves 121 rather than one. Instead of bumping the blocker rings once, the shifting dogs 118, having ridge 123, bump said blocker rings twice in either direction of shift from neutral and three times from direct to overdrive or from overdrive to direct. In this way the synchronizing effect of the blocker rings is greatly enhanced. It will be readily understood that the clutching unit must respond almost instantaneously from a dead still position to about 3000 r.p.m., and conversely from high speed rotation to dead still. The multiple bumping caused by the increased number of grooves insures a good frictional contact between the blocker rings and the cone surfaces and therefore a more effective clutching unit.

The front end of drive member 114 is held against longitudinal movement along sun gear spline shaft 102 by lock ring 126. Lock ring 126 is recessed into the outer diameter of shaft 102 and in conjunction with the raised shoulder 128 spaced forwardly therefrom forms a holding means for the needle bearings 130. Needle bearings 130 support the generally front portion of the shaft 102 within the spider unit 50. As can be seen bearings 130 are generally located so that they engage the rear portion of said spider unit 50 relatively near the spline boss portion 54 and the cone surface 56.

The approximate peripheral forward quarter section of said spline shaft 102 forms a spline sun gear 132. Planet pins 134 and needle bearings 136 in the spider unit 50 support planet gears 138 which mesh with sun gear 132.

A last major component of the overdrive transmission is the planetary housing generally shown by the number 140. Planetary housing 140 is concentrically mounted over the sleeve portion 52 of spider unit 50 and rotates freely on said spider unit by the dual set of needle bearings 142. At the same time thrust needle bearings 150 support the forward face of planetary housing 140 against the spacer washer 58. By the same token, rear thrust needle bearings 148 hold the planetary housing 140 against the forwardmost face of the enlarged portion of spider unit 50 or, stated another way, at the rear end of the sleeve portion 52 of the spider unit. A ring gear 144 is formed in the rear part of said planetary housing 144 and said ring gear 144 meshes with the planets 138 supported in the spider unit. A retaining ring 152 is interposed in a groove around the inside of said ring gear and adjacent the rear end of the teeth thereof. The planetary housing unit 140 is completed by the formation thereon of an external drive gear 146 at the forwardmost portion thereof. It is the drive gear portion 146 of the planetary housing which is substituted for the drive gear 18 which is the conventional gear removed from the transfer case described earlier.

FIGURES 1 and 7 show the general arrangement of the shifting mechanisms for the synchromesh clutch unit. While the details of the shifting unit are not essential to an understanding of this invention it is felt that in order to fully describe the operation of this overdrive transmission it is necessary to describe the shifting mechanism in general terms. A port 151 in the enlarged portion of housing case 22 in the front wall thereof and a journal area 154 in the housing cover 28 combined to support the shifter rail 156. The port 151 is covered on the outside thereof by a gland 158, and the rear end of journal 154 of the housing cover 28 has a plug 160. Shift rail 156 has an overdrive groove 162 and straight drive groove 164. Within the housing case 22, of course, and attached to the shift rail 156 is a shifter fork 166 which, as can be seen by reference to FIGURE 2, is designed to collar with the channel portion of the shift ring 116. A spring loaded ball 168 is held in place against the shift rail 156 between the grooves 162 and 164 by use of a conventional jam nut and spring. By moving the shift rail 156 forward, ball 168 is moved into groove 164 to hold the shift rail and consequently the shift fork 166 in straight drive or 1 to 1 drive ratio. By the same token, if the shift rail 156 is moved rearwardly the ball 160 then engages groove 162 and the shift fork 166 moves the shift ring 116 rearwardly to give the overdrive ratio.

*Lubrication*

A means for lubricating the transmission as so far described will now be detailed. The main oil passage 26, described earlier, can be seen by reference to FIGURE 2 to coincide with the rear opening in the transfer case 10. In order to get oil or lubricant into passage 26 and thus on its way towards the rear of the overdrive transmission proper it is necessary to install a tubular oil scoop generally referred to by the number 170 (see FIGURES 1, 2 and 4). Said tube takes the general configuration of the passage 26 in housing case 22 and passage 30 in housing cover 28. Oil scoop 170 is slightly over 5 inches in length and can be seen by particular reference to FIGURE 4. It tapers in size from its front end to its rear end, or in other words, from the end which is inserted into the transfer case to the end which is supported in the passage 26. Beginning with the portion of scoop 170 which protrudes from the housing case 22, scoop 170 is left open on its upper side to present what might be termed a trough portion 172. Approximately 1 inch of the larger rear end of scoop 170 as at 174 is left whole since it is that portion which remains in passage 26 to give the scoop 170 its support within the overdrive transmission housing and within the transfer case.

It will be appreciated that the drive gear 146 on the planetary housing 140 engages idler gears (not shown) which idler gears in turn engage drive gears on the propeller shafts. When the vehicle is moving, the rotating gears in the transfer case will throw oil so that in fact a substantial amount of the oil falls on the protruding scoop 170. It is by this initial means, i.e. the oil scoop, that the oil or lubricant begins its circulation route through the overdrive transmission parts.

The arrows, particularly in FIGURE 2, trace the route the lubricant takes as it is caught in the oil scoop. The oil flows by gravity because of the approximate 7° downward slope beginning with the forwardmost end of said scoop 170 and continues through the passage 26 and passage 30 and through the notch portion 36 in the cap 34. Some of the oil is then channeled into and through rear main bearing 100 and along the annular passage formed between stationary member 90 and drive member 114. Drive member 114 and stationary member 90 are concentrically spaced apart so that the passage just mentioned does extend a full 360° around the drive member 114. Oil then proceeds through this passage forwardly to lubricate the synchromesh clutching unit.

By far the greater volume of lubricant flowing from scoop 170 through the passages to the rear of the transmission finds its way down past bearing main rear bearing 100 to what might be called generally the axis of the entire transmission. It will be noted that the shaft 102 is hollow. The oil flows into the hollow cavity of the shaft 102 and works its way forwardly. Needle bearings 130 which permit free rotation between the spline shaft 102 and the spider unit 50 are lubricated by virtue of radially extending orifices or holes 180 in the wall of spline shaft 102 offset from each other at 90° intervals. The hollow design of shaft 102 is also dictated by the need to reduce the weight of the transmission and to reduce dynamic inertia in the sun gear spline shaft, while still keeping the shaft diameters large enough to provide the required torsional resistance.

It can be easily understood that when the shaft 102 is rotating that lubricant will be flung outwardly against the interior walls of said shaft by centrifugal force. Thus the radially extending holes 180 allow oil to escape from the interior of said spline shaft and actually to be forced into the needle bearings 130. Lubricant flowing into passages 180 lubricates not only bearings 130 but also passes through said bearings and into the components of the synchromesh clutching unit.

The sun gear portion of said spline shaft is slightly reduced in diameter relative to the rest of spline shaft 102 to accommodate the small diameter sun gear 132. For this reason a restricted hollow portion 182 is formed through the center of the sun gear portion of the shaft. In order to properly lubricate the sun gear, the planets and the ring gear, however, it is necessary to also provide radially extending lubricant passages 184 through said sun gear portion of the spline shaft. It has been found that like radially extending holes 180, the radially extending passages 184 should be spaced from each other 90°.

When the transmission has been shifted to overdrive, shaft 102 is fixed in nonrotating position by the synchro. It would appear that without rotation of the shaft there would be a tendency for the bearings 130 and synchro to become oil starved. Such is not the case. Oil is maintained deep enough in the hollow spline shaft 102 so that at all times at least two of the axially extending oil passages are beneath the oil surface level. Lubricant then passes through the passages by gravity or is in fact drawn through said passages by the requirements of the components revolving around the nonrotating shaft.

The planet gear needle bearings 136 are lubricated in similar fashion. Again, a plurality of radial oil passages 186 are provided in each of the planet gears 138 at 90° intervals. Lubricant passing from the spline shaft through passages 184 is directed into planet gear oil passages 186. In this manner, the planet gear needle bearings 136 are adequately lubricated.

Ring gear 144 receives lubricant from oil passing through planet gears 138 and needle bearings 136 out of passages 186. Since the planetary housing 140 will be rotating at all times that the transmission is engaged in either direct drive or overdrive oil will be held or plastered against the ring gear 144 to practically immerse the teeth thereof. It is for this purpose that retaining ring 152 is inserted at the rear edge of said ring gear teeth 144 so that at all times a certain quantity of the oil is restrained from moving out or away from said ring gear.

That lubricant which does not pass out of shaft 102 through the radially extending holes 180 and 184 flows to the extreme forward end through restricted shaft passage 182 where it passes into the annular space 70 in the rear portion of the drive nut 64. Drive nut 64 is likewise provided between its main threaded portion and the slotted teeth portion with four equi-spaced radially extending oil passages 188. Lubricant thrown out through said passage 188 finds its way into the annular space between drive nut 64 and sleeve portion 52 of the spider unit 50 and continues to move forwardly. This is so because of the resilient O-ring 190 which is interposed in the external groove 72 in the drive nut 64. Said resilient O-ring 190 in effect seals the rear outside portion of drive nut 64 with respect to the inside or interior wall of the sleeve portion 52. Thus, oil or lubricant is prevented from passing rearwardly through said space between the sleeve portion 52 and the drive nut 64 and must, in order to move, flow forwardly.

Radially extending oil passages 192, of which two in number spaced at 180° intervals are preferred, are also provided in the sleeve portion 52 between the dual needle bearings 142. Said bearings 142 journal said spider and said planetary housing in free rotation with respect to each other. The needle thrust bearings 148 and 150, located at each end of the planetary housing portion journaled on the sleeve portion 52, are lubricated by lubricant flowing out of passages 188 in drive unit 64, through the annular space between sleeve portion 52 and said drive unit and then through passages 192. Lubricant in the ring gear 144 will also find its way into the rear planetary housing needle thrust bearing 148 and of course the forward planetary housing needle bearing 150 will be practically awash in lubricant. In the described foregoing manner all of the components which require lubrication are adequately lubricated because of the strategic provision of lubricant circulation passages.

In the embodiment of the overdrive transmission just described the sun gear 132 has 14 teeth, the 4 planetary gears 138 have 14 teeth each and the ring gear 144 has 42 teeth. This particular combination of gearing gives an overdrive ratio of approximately 1.27 to 1.

An alternative embodiment of this overdrive transmission giving a slightly higher overdrive ratio is best shown in FIGURES 3 and 6. In this alternative embodiment a sun gear 200, which can be seen to be slightly larger in diameter than the sun gear 132 in the preferred embodiment, has 18 teeth. The spider unit 50 carries 3 planetary gears 202, each of which has 12 teeth. The ring gear in this embodiment also has 42 teeth. Such specifications raise the drive ratio to about 1.42 to 1. The spline shaft 198 does not have the restricted passage 182 as seen in the preferred embodiment. In fact, the hollow shaft 198 becomes larger in diameter at its forward end, that is the end closest to the main transmission shaft 14 and the threaded portion 20. Approximately ¾ inch back from the front end of said spline shaft 198 is a slight shoulder 206 formed by a reduction of the inside diameter of said hollow shaft 198. Said shoulder 206 serves as the rear holding means for an oil shaft generally shown by the number 208.

Said oil shaft 208 is made up of an enlarged section 210 and reduced portion 212. Said shaft 208 is hollow through its center and has four radially extending passages 214 set apart from each other at 90° intervals in the enlarged portion 210. An external annular semicircular groove 216 runs around the generally center part of the enlarged portion 210 and intercepts passages 214. Oil is permitted to flow from the spline shaft 198 into the oil shaft 208 and out the radial passages 214 in said oil shaft and into the radial passages 218 in the spline shaft 198. Radial passages 218 are generally coincident with the center of sun gear 200 so that the sun gear itself is properly lubricated. Furthermore, oil flowing out of the oil shaft 208 through the sun gear oil passages 218 migrates to the planetary gears 202 through oil passages 224 in said planet gears 202 so that the planet pins 220 and the planet needle bearing 222 are properly lubricated. The lubricant then proceeds through planet gear passages 224 to ring gear 204.

The reduced portion 212 of said oil shaft 208 extends, in a fashion similar to the first embodiment spline shaft 102, into the space at the rear of the drive nut 64 from which the radial oil passages 188 extend. Oil shaft 208 is held in position at the front end thereof by retaining ring 226. Except for this slight modification of the spline shaft design, this overdrive transmission in principle is almost identical to the first embodiment; the difference being in the variations in the size of the sun gear, the size and number of the planet gears and the number of teeth on each of the gearing components.

Obviously, the overdrive ratios specified in this disclosure are considered to be nonlimiting since those skilled in the art will recognize that the overdrive ratio may be altered.

The foregoing is considered as illustrative only of the principle of this invention. Since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. An overdrive transmission unit for mounting on an existing transfer case having a main drive shaft projecting into such transfer case and wherein the transfer case has an opening beyond the end of said drive shaft providing access to the interior of said transfer case,
    said unit including a first assembly and a second assembly adapted to be arranged in line with one another,
    said unit including a housing to be removably secured to said transfer case in register with said opening,
    a planetary system including a sun gear, a hollow ring gear member and a hollow, one-piece, rigid spider member surrounded by the hollow ring gear member and surrounding the sun gear,
    said spider member having a portion of a size to fit on said main drive shaft,
    nut means carried rotatably in said spider member for securing said spider member to said main drive shaft,
    first antifriction bearing means mounting said ring gear member on said portion of said spider member,
    a shifting assembly including an inner shaft member, second antifriction bearing means rotatably mounting one end of said inner shaft member in said unit housing,
    said sun gear being rigidly fixed to the inboard end portion of said shaft member,
    intermediate antifriction bearing means disposed laterally between the spider member and said inner shaft member and longitudinally between said first and second antifriction bearing means,
    said shifting assembly including means whereby said spider member may be drivingly connected directly to said shaft member, or whereby said shaft member may be immovably secured to said housing,
    said planetary system including planetary gear means carried by said spider member and providing an operative connection between said sun gear and said ring gear member,
    said shaft member, shifting mechanism and housing being removable to expose said nut means to facilitate tightening or loosening thereof,
    the outboard end of said spider member surrounding a portion of said shaft member wherein said intermediate antifriction bearing means is located.

2. In combination with a transmission having a short output drive shaft and a housing surrounding the drive shaft and open at one end, an overdrive attachment comprising,
    a rigid, integral, tubular shaft extension member having an inner end portion splined to the shaft, a gear mounting portion and an outer end portion,
    fastener means in the shaft extension member for engaging the end of the drive shaft and locking the shaft extension member on the drive shaft,
    planetary gear means carried by the gear mounting portion of the shaft extension member,
    first antifriction bearing means mounted on the first end portion of the shaft extension member,
    a tubular gear member having an inner tubular end portion having an external gear for driving other gearing and journaled on the first antifriction bearing means and also having a tubular end portion having an internal ring gear meshing with the planetary gear means,
    second antifriction bearing means insertable into and removable from the outer end portion of the shaft extension member,
    a spline shaft having an intermediate portion carrying the second antifriction bearing means, an inner end portion adjacent the intermediate portion and having a sun gear meshing with the planetary gear means, a clutch-mounting portion adjacent the intermediate portion and an outer end portion adjacent the clutch-mounting portion,
    third antifriction bearing means journaling the outer end portion of the spline shaft,
    a housing case mounting the third antifriction bearing means and adapted to be rigidly secured to the housing of the transmission,
    and clutch means mounted on the clutch-mounting portion of the spline shaft and operable to selectively connect the spline shaft to the housing case and the tubular gear member.

3. In an overdrive adapted to be mounted on a vehicle transmission having a housing and an output drive shaft having an end portion,
    an elongated, rigid, first tubular member having at one end thereof a splining sleeve portion adapted to be splined to the output drive shaft, an intermediate, tubular spider portion and a second sleeve portion at the other end thereof,
    fastener means carried in and adapted to engage the end portion of the output drive shaft and hold the tubular member rigidly on the output drive shaft,
    the tubular spider portion and the second sleeve portion providing access therethrough to the fastener means for manipulation of the fastener means, first antifriction bearing means mounted on the exterior of the splining sleeve portion, a rigid second tubular member having a first end portion provided with an external drive gear and mounted on the first anti-friction bearing means, the rigid second tubular member having a second end portion having an internal ring gear extending over the spider portion, planetary gear means carried by the spider portion in mesh with the ring gear, the first tubular member, the first antifriction bearing means, the second tubular member and the planetary gear means forming a first unitary assembly adapted to be inserted into the housing and be mounted on the output drive shaft, a housing case adapted to be detachably secured to the end of and form an extension of the housing, second antifriction bearing means insertable into the second sleeve portion of the first tubular member, third antifriction bearing means mounted in alignment with the second antifriction bearing means and carried by the housing case, a spline shaft having a first end portion provided with a sun gear meshing with the planetary gear means, a second portion adjacent the first end portion and journaled in the second antifriction bearing means, a third, intermediate, mounting portion adjacent the second portion thereof and a second end portion journaled in the third antifriction bearing means, clutch means splined to the spline shaft and mounted on the mounting portion of the spline shaft and adapted to selectively lock the spline shaft to the second sleeve portion of the first tubular member and the housing case, and clutch-actuating means carried by the housing case, the housing case, the spline shaft, the clutch means, the clutch-actuating means and the second and third antifriction bearing means forming a unitary assembly adapted to be assembled with and dis-assembled from the housing and the first unitary assembly as a unit.

4. In an overdrive attachment, a first rigid tubular shaft extension member having a tubular, internally splined tubular first end portion, an intermediate, tubular spider portion and a tubular second end portion, a rigid, integral, tubular gear member having a first tubular end portion provided with an external gear and a second tubular end portion having an internal ring gear, attaching nut means carried in the shaft extension member and adapted to be manipulated through the spider portion of the shaft extension member, first, radial-and-thrust, needle bearing means mounted on the first end portion of the shaft extension member and in the first tubular end portion of the gear member to journal the gear member on the shaft extension member, planetary gear means mounted on the spider portion in mesh with the ring gear, a spline shaft having a first end portion provided with a sun gear positioned in the spider portion and meshing with the planetary gear means, a mounting portion adjacent the sun gear and positioned in the tubular second end portion of the shaft extension member, a third, intermediate portion and a second end portion, second needle bearing means positioned on the mounting portion of the spline shaft and positioned in the tubular second end portion of the shaft extension member and journaling the first end of the spline shaft in the shaft extension member, a housing case, radial-and-thrust antifriction bearing means carried by the housing case and journaling the second end portion of the spline shaft, and clutch means mounted in the housing case on the mounting portion of the spline shaft and adapted to selectively connect the spline shaft to the shaft extension member and the housing case.

5. In an overdrive attachment adapted to be mounted on a stub shaft and a housing of a transmission, a rigid outer tubular member having a mounting sleeve portion at one end thereof and an internal ring gear at the other end thereof, a rigid intermediate tubular shaft extension member having an inner end portion adapted to be keyed to and mounted on the stub shaft, an intermediate spider portion co-extensive with the ring gear and an outer end portion, planetary gear means carried by the spider portion in mesh with the ring gear, antifriction bearing means journaling the sleeve portion of the outer tubular member on the inner end portion of the shaft extension member, a spline shaft means having an inner end portion having a sun gear thereon, a second portion adapted to extend into the outer end portion of the shaft extension member, a mounting portion and an outer end portion, second antifriction bearing means journaling the second portion of the spline shaft means in the outer end portion of the shaft extension member and permitting withdrawal of the spline shaft means from the shaft extension member, a housing case adapted to be detachably secured to the housing of the transmission, clutch means mounted on the mounting portion of the spline shaft for selectively connecting the spline shaft means to the shaft extension member and the housing case, and third antifriction bearing means journaling the outer end portion of the spline shaft means in the housing case.

6. In an apparatus including a transmission having a short output drive shaft and a housing surrounding the drive shaft and open at one end, an overdrive attachment comprising, a rigid, integral, tubular shaft extension member having an inner end portion splined to the shaft, a gear mounting portion and an outer end portion, fastener means in the shaft extension member for engaging the end of the drive shaft and locking the shaft extension member on the drive shaft, planetary gear means carried by the gear mounting portion of the shaft extension member, first antifriction bearing means mounted on the first end portion of the shaft extension member, a tubular gear member having an inner tubular end portion having an external gear for driving other gearing and journaled on the first antifriction bearing means and also having an outer tubular end portion having an internal ring gear meshing with the planetary gear means, second antifriction bearing means mounted in the outer end portion of the shaft extension member, a spline shaft means having a first portion journaled in the second antifriction bearing means, a second portion adjacent the first portion and having a sun gear meshing with the planetary gear means, a clutch-mounting portion adjacent the first portion and an outer end portion adjacent the clutch-mounting portion, third, radial-and-thrust, antifriction bearing means journaling the outer end portion of the spline shaft means, a housing case mounting the third antifriction bearing means and adapted to be rigidly secured to the housing of the transmission, and clutch means mounted on the clutch-mounting portion of the spline shaft means and operable to selectively connect the spline shaft means to the housing case and the tubular gear member.

References Cited by the Examiner

UNITED STATES PATENTS

| | | | |
|---|---|---|---|
| 1,674,006 | 6/1928 | Ford | 74—781 |
| 2,044,660 | 6/1936 | Alden | 74—781 |
| 2,244,668 | 6/1941 | Barnes | 74—781 |
| 2,380,717 | 7/1945 | Beltz | 74—781 X |
| 2,418,102 | 3/1947 | Vincent | 74—781 X |
| 2,681,126 | 6/1954 | Searls. | |
| 2,708,017 | 5/1955 | Orr et al. | 192—18 |
| 2,771,795 | 11/1956 | Orr | 74—781 |
| 2,802,548 | 8/1957 | Mart et al. | |
| 2,883,020 | 4/1959 | Kummich et al. | 192—18 |
| 2,896,479 | 7/1959 | Kelbel | 74—781 |
| 2,911,848 | 11/1959 | Carnagua | 74—781 X |
| 2,948,557 | 8/1960 | Howe et al. | 278—53 |
| 2,950,934 | 8/1960 | Uebing | 287—53 |
| 2,983,165 | 5/1961 | Moore et al. | 74—781 |

DON A WAITE, *Primary Examiner.*